(12) United States Patent
Kaminsky et al.

(10) Patent No.: US 11,215,410 B2
(45) Date of Patent: Jan. 4, 2022

(54) METHODS AND APPARATUS FOR IMPROVING MULTI-PLATE SCRAPED HEAT EXCHANGERS

(71) Applicant: ExxonMobil Upstream Research Company

(72) Inventors: Robert D. Kaminsky, Houston, TX (US); Marcel Staedter, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 79 days.

(21) Appl. No.: 16/660,206

(22) Filed: Oct. 22, 2019

(65) Prior Publication Data
US 2020/0158449 A1 May 21, 2020

Related U.S. Application Data

(60) Provisional application No. 62/769,890, filed on Nov. 20, 2018.

(51) Int. Cl.
*F28F 19/00* (2006.01)
*F28F 3/08* (2006.01)
*B01D 5/00* (2006.01)

(52) U.S. Cl.
CPC .......... *F28F 19/008* (2013.01); *B01D 5/0003* (2013.01); *B01D 5/0015* (2013.01); *B01D 5/0024* (2013.01); *F28F 3/086* (2013.01)

(58) Field of Classification Search
CPC ......... F28F 19/008; F25J 5/00; F25J 2205/20; F28D 2021/0033
See application file for complete search history.

(56) References Cited

U.S. PATENT DOCUMENTS 1,375,210 A * 4/1921 Clayton ............... A23G 3/0226
165/94
1,914,337 A 6/1933 Belt
(Continued)

FOREIGN PATENT DOCUMENTS

CN 102620523 10/2014
CN 102628635 10/2014 ................ F25J 3/08
(Continued)

OTHER PUBLICATIONS

U.S. Appl. No. 62/458,127, filed Feb. 13, 2017, Pierre, Fritz, Jr.
(Continued)

*Primary Examiner* — Leonard R Leo
(74) *Attorney, Agent, or Firm* — ExxonMobil Upstream Research Company—Law Department (57) ABSTRACT

A scraped heat exchanger apparatus, including a vessel and a plurality of internally cooled plates disposed parallel to each other within the vessel. A rotating shaft is disposed at a central axis of the vessel. A rotating scraper arm, connected to the rotating shaft, moves between adjacent plates. The rotating scraper arm includes a scraper positioned to scrape solids from the outer surfaces of adjacent plates. A cooling fluid flows through an interior of each plate. The cooling fluid cools a gaseous process fluid flowing between adjacent plates. An opening in each of the plates permits the process fluid, and solids removed from the process fluid and scraped by the rotating scraper arm, to pass through the plates.

20 Claims, 3 Drawing Sheets

(56) References Cited

U.S. PATENT DOCUMENTS

| | | | | |
|---|---|---|---|---|
| 1,974,145 | A | 9/1934 | Atwell | 183/120 |
| 2,007,271 | A | 7/1935 | Frankl | 62/175.5 |
| 2,011,550 | A | 8/1935 | Hasche | 62/121 |
| 2,321,262 | A | 6/1943 | Taylor | 62/140 |
| 2,475,255 | A | 7/1949 | Rollman | 62/170 |
| 2,537,045 | A | 1/1951 | Garbo | 62/122 |
| 3,014,082 | A | 12/1961 | Woertz | 260/676 |
| 3,103,427 | A | 9/1963 | Jennings | 62/39 |
| 3,180,709 | A | 4/1965 | Yendall et al. | 23/210 |
| 3,313,341 | A * | 4/1967 | List | F28C 3/18 165/92 |
| 3,347,055 | A | 10/1967 | Blanchard et al. | 62/9 |
| 3,370,435 | A | 2/1968 | Arregger | 62/28 |
| 3,400,512 | A | 9/1968 | McKay | 55/69 |
| 3,400,547 | A | 9/1968 | Williams et al. | 62/55 |
| 3,511,058 | A | 5/1970 | Becker | 62/9 |
| 3,724,225 | A | 4/1973 | Mancini et al. | |
| 3,724,226 | A | 4/1973 | Pachaly | 62/39 |
| 3,770,252 | A * | 11/1973 | Gordini | F28F 19/008 366/147 |
| 3,878,689 | A | 4/1975 | Grenci | 62/9 |
| 4,059,047 | A * | 11/1977 | Sollich | A23G 1/18 99/455 |
| 4,066,546 | A * | 1/1978 | Sasaki | B01D 35/22 210/193 |
| 4,271,682 | A * | 6/1981 | Seki | F28D 11/02 62/354 |
| 4,279,295 | A * | 7/1981 | Duckworth | A23G 1/18 165/94 |
| 4,281,518 | A | 8/1981 | Muller et al. | 62/12 |
| 4,415,345 | A | 11/1983 | Swallow | 62/28 |
| 4,558,733 | A * | 12/1985 | Lindroos | F28F 19/00 165/94 |
| 4,609,388 | A | 9/1986 | Adler et al. | 62/12 |
| 4,669,277 | A | 6/1987 | Goldstein | |
| 4,769,054 | A | 9/1988 | Steigman | 62/12 |
| 4,796,441 | A * | 1/1989 | Goldstein | F25B 29/003 165/94 |
| 4,892,033 | A * | 1/1990 | Sollich | A23G 1/18 165/94 |
| 4,998,464 | A * | 3/1991 | Kubacki | F28F 19/008 165/94 |
| 5,025,860 | A | 6/1991 | Mandrin | 166/267 |
| 5,137,558 | A | 8/1992 | Agrawal | 62/24 |
| 5,139,547 | A | 8/1992 | Agrawal et al. | 62/8 |
| 5,141,543 | A | 8/1992 | Agrawal et al. | 62/8 |
| 5,522,236 | A * | 6/1996 | Jensen | F25C 1/142 165/94 |
| 5,632,159 | A * | 5/1997 | Gall | F25C 1/142 165/94 |
| 5,638,698 | A | 6/1997 | Knight et al. | 62/632 |
| 5,850,782 | A * | 12/1998 | Aasted | A23G 1/18 99/455 |
| 5,862,745 | A * | 1/1999 | Aasted | A23G 1/04 99/470 |
| 5,950,453 | A | 9/1999 | Bowen et al. | 62/612 |
| 6,003,603 | A | 12/1999 | Breivik et al. | 166/357 |
| 6,082,133 | A | 7/2000 | Barclay et al. | |
| 6,158,242 | A | 12/2000 | Lu | 62/637 |
| 6,295,838 | B1 | 10/2001 | Shah et al. | 62/643 |
| 6,298,688 | B1 | 10/2001 | Brostow et al. | 62/613 |
| 6,412,302 | B1 | 7/2002 | Foglietta | 62/611 |
| 6,662,589 | B1 | 12/2003 | Roberts et al. | 62/425 |
| 6,889,522 | B2 | 5/2005 | Prible et al. | 62/611 |
| 6,960,014 | B2 * | 11/2005 | Kongstad | A23G 1/18 366/147 |
| 7,143,606 | B2 | 12/2006 | Trainer | 62/611 |
| 7,219,512 | B1 | 5/2007 | Wilding et al. | |
| 7,278,281 | B2 | 10/2007 | Yang et al. | 62/612 |
| 7,386,996 | B2 | 6/2008 | Fredheim et al. | 62/612 |
| 7,520,143 | B2 | 4/2009 | Spilsbury | 62/620 |
| 7,712,331 | B2 | 5/2010 | Dee et al. | 62/612 |
| 8,079,321 | B2 | 12/2011 | Balasubramanian | 114/74 |
| 8,435,403 | B2 | 5/2013 | Sapper et al. | 208/254 |
| 8,464,289 | B2 | 6/2013 | Pan | 725/34 |
| 8,601,833 | B2 | 12/2013 | Dee et al. | 62/648 |
| 8,616,012 | B2 | 12/2013 | Duerr et al. | 62/89 |
| 8,747,520 | B2 | 6/2014 | Bearden et al. | 95/41 |
| 9,016,088 | B2 | 4/2015 | Butts | 62/613 |
| 9,339,752 | B2 | 5/2016 | Reddy et al. | B01D 53/002 |
| 9,435,229 | B2 | 9/2016 | Alekseev et al. | 60/643 |
| 9,439,077 | B2 | 9/2016 | Gupta et al. | H04W 12/12 |
| 9,459,042 | B2 | 10/2016 | Chantant et al. | 62/50.2 |
| 9,995,521 | B2 | 6/2018 | Mogilevsky | |
| 10,294,433 | B2 | 5/2019 | Grainger et al. | |
| 2006/0000615 | A1 | 1/2006 | Choi | 166/352 |
| 2007/0277674 | A1 | 12/2007 | Hirano et al. | 95/290 |
| 2008/0087421 | A1 | 4/2008 | Kaminsky | |
| 2008/0302133 | A1 | 12/2008 | Saysset et al. | |
| 2009/0217701 | A1 | 9/2009 | Minta et al. | 62/612 |
| 2010/0192626 | A1 | 8/2010 | Chantant | 62/606 |
| 2010/0251763 | A1 | 10/2010 | Audun | 62/614 |
| 2011/0036121 | A1 | 2/2011 | Roberts et al. | 62/612 |
| 2011/0126451 | A1 | 6/2011 | Pan et al. | 44/451 |
| 2011/0259044 | A1 | 10/2011 | Baudat et al. | 62/611 |
| 2012/0180657 | A1 | 7/2012 | Monereau et al. | |
| 2012/0285196 | A1 | 11/2012 | Flinn et al. | 62/620 |
| 2013/0074541 | A1 | 3/2013 | Kaminsky et al. | 62/601 |
| 2013/0199238 | A1 | 8/2013 | Mock et al. | 62/611 |
| 2014/0130542 | A1 | 5/2014 | Brown et al. | 62/612 |
| 2015/0285553 | A1 | 10/2015 | Oelfke et al. | 62/611 |
| 2017/0010041 | A1 | 1/2017 | Pierre, Jr. et al. | 62/616 |
| 2017/0016667 | A1 | 1/2017 | Huntington et al. | 62/614 |
| 2017/0016668 | A1 | 1/2017 | Pierre, Jr. et al. | 62/614 |
| 2017/0167785 | A1 | 6/2017 | Pierre, Jr. et al. | 62/613 |
| 2017/0167786 | A1 | 6/2017 | Pierre, Jr. | 62/613 |
| 2017/0167787 | A1 | 6/2017 | Pierre, Jr. et al. | 62/614 |
| 2017/0167788 | A1 | 6/2017 | Pierre, Jr. et al. | 62/620 |

FOREIGN PATENT DOCUMENTS

| | | | |
|---|---|---|---|
| DE | 1960515 | 5/1971 | F25J 1/02 |
| DE | 2354726 | 5/1975 | F17C 9/04 |
| DE | 3149847 | 7/1983 | B01D 5/00 |
| DE | 3622145 | 1/1988 | |
| DE | 19906602 | 8/2000 | F25J 3/08 |
| DE | 102013007208 | 10/2014 | B01D 3/14 |
| EP | 1715267 | 10/2006 | F25J 3/02 |
| EP | 1972875 | 9/2008 | F25J 3/04 |
| EP | 2157013 | 8/2009 | F17C 3/02 |
| EP | 2629035 | 8/2013 | F25J 1/00 |
| FR | 2756368 | 5/1998 | B01D 53/26 |
| GB | 1376678 | 12/1974 | F25J 1/02 |
| GB | 1596330 | 8/1981 | F25J 1/02 |
| GB | 2172388 | 9/1986 | E21B 43/16 |
| GB | 2333148 | 7/1999 | F25J 1/02 |
| GB | 2470062 | 11/2010 | F25J 1/02 |
| GB | 2486036 | 11/2012 | F25J 1/02 |
| JP | 59216785 | 12/1984 | F25J 1/02 |
| JP | 2530859 | 4/1997 | G02F 1/13 |
| JP | 5705271 | 11/2013 | F25J 3/00 |
| JP | 5518531 | 6/2014 | Y02P 20/152 |
| KR | 2010/0112708 | 10/2010 | F17C 5/00 |
| KR | 2011/0079949 | 7/2011 | F25J 3/02 |
| WO | WO2006/120127 | 11/2006 | F25J 3/02 |
| WO | WO2008/133785 | 11/2008 | B63B 25/08 |
| WO | WO2011/101461 | 8/2011 | B63B 25/16 |
| WO | WO2012/031782 | 3/2012 | F25J 1/02 |
| WO | 2012/162690 | 11/2012 | |
| WO | WO2014/048845 | 4/2014 | F25J 1/00 |
| WO | WO2015/110443 | 7/2015 | F25J 1/00 |
| WO | 2016/060777 | 4/2016 | |
| WO | WO2017/011123 | 1/2017 | F25J 3/08 |
| WO | WO2017/067871 | 4/2017 | F01D 15/10 |

OTHER PUBLICATIONS

U.S. Appl. No. 62/458,131, filed Feb. 13, 2017, Pierre, Fritz, Jr.
U.S. Appl. No. 62/463,274, filed Feb. 24, 2017, Kaminsky, Robert D. et al.
U.S. Appl. No. 62/478,961, Balasubramanian, Sathish.
Bach, Wilfried (1990) "Offshore Natural Gas Liquefaction with

(56) References Cited

OTHER PUBLICATIONS

Nitrogen Cooling—Process Design and Comparison of Coil-Wound and Plate-Fin Heat Exchangers," *Science and Technology Reports*, No. 64, Jan. 1, 1990, pp. 31-37.

Chang, Ho-Myung et al., (2019) "Thermodynamic Design of Methane Liquefaction System Based on Reversed-Brayton Cycle" Cryogenics, pp. 226-234.

ConocoPhillips Liquefied Natural Gas Licensing (2017) "Our Technology And Expertise Are Ready To Work Toward Your LNG Future Today," http://lnglicensing.conocophillips.com/Documents/15..1106%20LNG%20Brochure_March2016.pdf, Apr. 25, 2017, 5 pgs.

Danish Technologies Institute (2017) "Project—Ice Bank System with Pulsating and Flexible Heat Exchanger (IPFLEX)," https://www.dti.dk/proiects/proiect-ice-batik-system-with-pulsating-andflexible-heat-exchanger-ipflex/37176.

Diocee, T. S. et al. (2004) "Atlantic LNG Train 4-The Worlds Largest LNG Train", *The 14th International Conference and Exhibition on Liquefied Natural Gas (LNG 14)*, Doha, Qatar, Mar. 21-24, 2004, 15 pgs.

IceGen (2014) "Slurry Ice A Citrus Industry Revolution," www.icegen.com, Oct. 28-31, 2014, Parma, Italy, 13 pages.

Khoo, C. T. et al. (2009) "Execution of LNG Mega Trains-The Qatargas 2 Experience," *WCG*, 2009, 8 pages.

Laforte, C. et al. (2009) "Tensile, Torsional and Bending Strain at the Adhesive Rupture of an Iced Substrate," *ASME 28th Int'l Conf. on Ocean, Offshore and Arctic Eng.*, OMAE2009-79458, 8 pgs.

Mclachlan, Greg (2002) "Efficient Operation of LNG From The Oman LNG Project," *Shell Global Solutions International B.V.*, Jan. 1, 2002, pp. 1-8.

Olsen, Lars et al. (2017).

Ott, C. M. et al. (2015) "Large LNG Trains: Technology Advances to Address Market Challenges", *Gastech*, Singapore, Oct. 27-30, 2015, 10 pgs.

Publication No. 43031 (2000) Research Disclosure, Mason Publications, Hampshire, GB, Feb. 1, 2000, p. 239, XP000969014, ISSN: 0374-4353, paragraphs [0004], [0005] & [0006].

Publication No. 37752 (1995) Research Disclosure, Mason Publications, Hampshire, GB, Sep. 1, 1995, p. 632, XP000536225, ISSN: 0374-4353, 1 page.

Ramshaw, Ian et al. (2009) "The Layout Challenges of Large Scale Floating LNG," *ConocoPhillips Global LNG Collaboration*, 2009, 24 pgs, XP009144486.

Riordan, Frank (1986) "A Deformable Heat Exchanger Separated by a Helicoid," *Journal of Physics A: Mathematical and General*, v. 19.9, pp. 1505-1515.

Roberts, M. J. et al. (2004) "Reducing LNG Capital Cost in Today's Competitive Environment", PS2-6, *The 14th International Conference and Exhibition on Liquefied Natural Gas (LNG 14)*, Doha, Qatar, Mar. 21-24, 2004, 12 pgs.

Shah, Pankaj et al. (2013) "Refrigeration Compressor Driver Selection and Technology Qualification Enhances Value for the Wheatstone Project," *17th Int'l Conf. & Exh. on LNG*, 27 pgs.

Tan, Hongbo et al. (2016) "Proposal and Design of a Natural Gas Liquefaction Process Recovering the Energy Obtained from the Pressure Reducing Stations of High-Pressure Pipelines," *Cryogenics*, Elsevier, Kidlington, GB, v.80, Sep. 22, 2016, pp. 82-90.

Tsang, T. P. et al. (2009) "Application of Novel Compressor/Driver Configuration in the Optimized Cascade Process," *2009 Spring Mtg. and Global Conf, on Process Safety-9th Topical Conf, on Gas Utilization*, 2009, Abstract, 1 pg. https://www.aiche.org/conferences/aiche-spring-meeting-and-globalcongress- on-process-safety/2009/proceeding/paper/7a-application-novel-compressordriver-configurationoptimized-cascader-process.

\* cited by examiner

METHODS AND APPARATUS FOR IMPROVING MULTI-PLATE SCRAPED HEAT EXCHANGERS

CROSS-REFERENCE TO RELATED APPLICATIONS

This application claims the priority benefit of U.S. Provisional Patent Application No. 62/769,890 filed Nov. 20, 2018, entitled METHODS AND APPARATUS FOR IMPROVING MULTI-PLATE SCRAPED HEAT EXCHANGERS.

This application is related to U.S. Provisional Application No. 62/769,886 filed Nov. 20, 2018, titled "Method for Using a Solid-Tolerant Heat Exchanger in Cryogenic Gas Treatment Processes", and U.S. Provisional Application No. 62/769,881 filed Nov. 20, 2018, titled "Poly Refrigerated Integrated Cycle Operation Using Solid-Tolerant Heat Exchangers", both of which are filed on an even date and have a common assignee herewith, the disclosures of which are incorporated by reference herein.

FIELD OF DISCLOSURE

The disclosure relates generally to gas processing. More specifically, the disclosure relates to the cooling and removal of contaminants in a gas stream using a heat exchanger.

DESCRIPTION OF RELATED ART

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

Multi-plate scraped heat exchangers are compact, efficient heat exchangers which can handle solid formation. Such exchangers, typified by the exchanger disclosed in U.S. Pat. No. 9,995,521, commonly are used in the food industry, for example, to generate ice slurries and juice concentrates. These exchangers are optimized for liquid systems which form solids and are not well-suited for gas flows which form solids (e.g., freezing of water moistureor $CO_2$). Solid-tolerant heat exchangers that effectively operate with gaseous working fluids may enable significantly simplified production of liquefied natural gas (LNG) and carbon capture processes. The application of these heat exchangers allows for direct cooling of process streams to cryogenic temperatures while solids are formed. This mitigates, or potentially eliminates, the requirement for upstream gas treatment—in the case of LNG, for example. Current designs of multi-plate scraped heat exchangers are not well-suited to be used in such processes. For example, gas flows typically have lower heat transfer rates than liquids, gas flows are less effective at moving solids through a system, and gas flows are more likely to take a short-cut through a system if a path exists. What is needed is a compact heat exchanger that can be used in gas processing methods.

SUMMARY

The present disclosure provides a scraped heat exchanger apparatus. The heat exchanger apparatus includes a vessel, and a plurality of internally cooled plates disposed parallel to each other within the vessel. A rotating shaft disposed at a central axis of the vessel. A rotating scraper arm, connected to the rotating shaft, is disposed to move between adjacent ones of the plurality of internally cooled plates. The rotating scraper arm includes a scraper positioned to scrape solids and/or liquids from an outer surface of said adjacent ones of the plurality of internally cooled plates. A cooling fluid flows through an interior of each of the plurality of internally cooled plates and cools a process fluid flowing between adjacent ones of the plurality of internally cooled plates. An opening in each of one or more of the plurality of internally cooled plates permits the process fluid, and solids removed from the process fluid and scraped by the rotating scraper arm, to pass through the one or more of the plurality of internally cooled plates.

The foregoing has broadly outlined the features of the present disclosure in order that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Several improvements are described herein to improve performance of multi-plate scraped heat exchangers for use with gas flows, such as natural gas to be liquefied or $CO_2$ removal from flue gas. Specifically, the design of multi-plate scraped heat exchangers is modified to accommodate and facilitate their application with gaseous process fluids.

Figure 1:
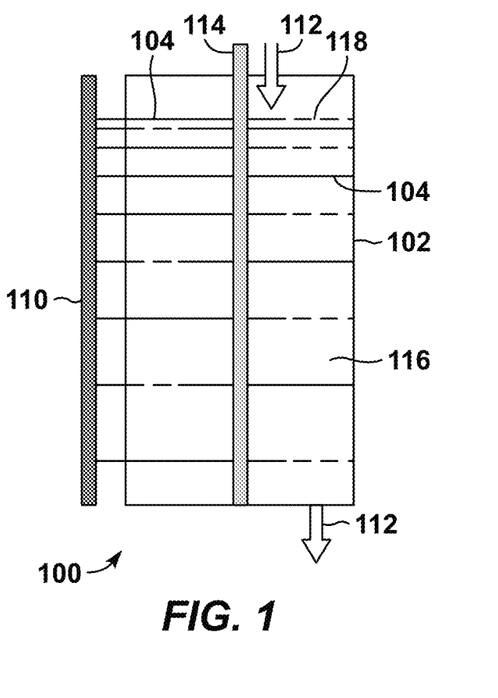
FIG. 1 is a side elevational view of a multi-plate scraped heat exchanger according to aspects of the disclosure.
Figure 2:
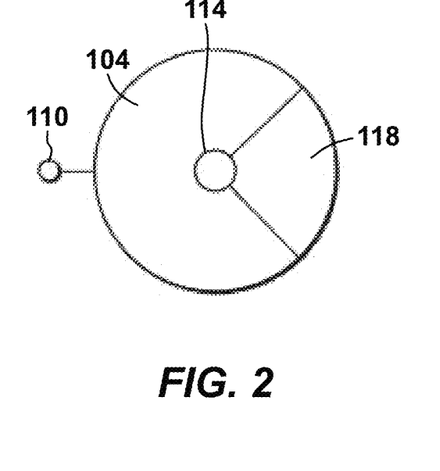
FIG. 2 is a top plan view of an interior of the multi-plate scraped heat exchanger of FIG. 1.
Figure 3:
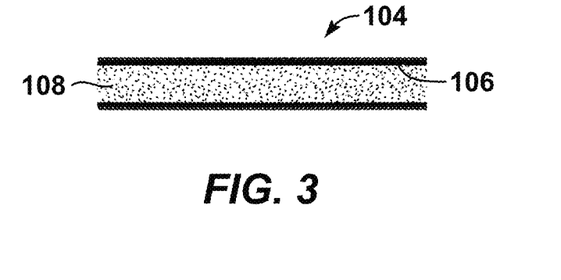
FIG. 3 is a partial cross-sectional view of an internally cooled plate shown in FIGS. 1-2.

FIGS. 1-3 depict a multi-plate scraped heat exchanger 100 according to an aspect of the disclosure. Heat exchanger 100 includes a cylindrical vessel 102. A stack of internally cooled plates 104 is disposed inside the cylindrical vessel. Depending on the orientation of the cylindrical vessel, the internally cooled plates may be vertically stacked (as depicted in FIG. 1), horizontally stacked, or any other desired rotation. However, a vertical or tilted orientation is preferred to allow gravity to aid movement of detached solids out of the heat exchanger. Each plate includes a hollow portion 106 through which cooling fluid 106 may be circulated. The cooling fluid may be distributed using a manifold 110 or other suitable structure. The cooling fluid may be composed of primarily propane, primarily ethane, primarily methane, or primarily nitrogen. As used herein, "primarily" means having a mole fraction of more than 50% of a stated substance. The cooling fluid cools the plates 104, which contact or otherwise interact with a process fluid 112 that passes through the cylindrical vessel. The process fluid 112 exchanges heat with the plates 104 and is cooled thereby. In an aspect, the process fluid may comprise natural gas, methane, or other gas.

Portions of the process fluid 112 may solidify and/or liquefy while exchanging heat and cooling in the cylindrical vessel. If the process fluid is natural gas, the solids/liquids may comprise contaminants such as water, carbon dioxide, hydrogen sulfide, waxes, or aromatic compounds. If the process fluid is flue gas, the solid-forming contaminants may primarily comprise water or $CO_2$. These solids/liquids (hereinafter referred to solely as solids) can accumulate on the plates, and if the plates are horizontally oriented and vertically stacked as shown in FIG. 1, the accumulated solids may impede flow of the process fluid through the cylindrical vessel. To remove the accumulated solids, a rotating shaft 114 is placed in the cylindrical vessel to rotate along an axis of the cylindrical vessel. One or more scraper arms 116 are connected to the rotating shaft. Each of the scraper arms are shaped and positioned to scrape or otherwise remove the accumulated solids adhering to or piled up upon or between adjacent plates. Specifically, each scraper arm 116 includes a scraper that removes pushes the solids to a notch 118 or other opening (shown in FIG. 2) in an adjacent plate 104. In some embodiments the notch 118 may by a slot or sector extending outwardly from the central axis (as shown in FIG. 2), with the angle A of the sector being sized as required for efficient removal of solids from the plate. In some aspects the angle A may be between 5 degrees and 90 degrees, or between 15 degrees and 60 degrees, or between 30 degrees and 50 degrees. In some embodiments the scraper arm is configured (e.g., by being curved or moving sufficiently fast) to move solids radially outwards in addition to detaching the solids from the plate. If the scraper arm moves solids outwards, the notch may comprise an opening or hole which does not extend from the central access but rather may be located close to the outer periphery of the plate. The solids fall through the notch 118 onto the surface of the plate below. Flow of the process fluid may also carry solids through the notch 118; however, gas flows tend to be weak for carrying solids unless the gas is flowing at high velocities. This process of scraping and falling continues until the solids reach the bottom of the cylindrical vessel, where the combined solids are removed from the cylindrical vessel. If the solids comprise carbon dioxide, the solids can be melted and used in gaseous or liquid form for injection into wells or reservoirs for pressure maintenance or carbon capture. If the solids comprise hydrogen sulfide, the solids can be melted and disposed of in various manners consistent with the properties thereof. The cooled process fluid, having some or all of its contaminants solidified and removed, exits the cylindrical vessel for further processing, which in a natural gas liquefaction process may include further separation and chilling steps.

Aspects of the disclosure may be varied to improve cooling performance and maximize efficiency and/or effectiveness of the heat exchanger. For example, the notches 118 in sequential plates 104 may be offset or non-aligned with each other to provide a tortuous path for the process fluid to flow between the plates and hence maximize fluid-plate contact and heat transfer. The plates 104 may be connected to the inner wall of the cylindrical vessel in such a way as to prevent any fluid—gaseous or liquid—from flowing around or beyond the perimeter of each plate. Sealing each plate to the cylindrical vessel eliminates bypass of the process fluid around each plate. This forces a change in flow direction between plates in an alternative or tortuous path. Thus the plates act as baffles to achieve a target shell-side flow pattern.

Aspects of the disclosure may seek to optimize heat transfer between the process fluid and the internally cooled plates by strategically spacing the plates. All plates may be separated by similar distances from respective adjacent plates, or the distances between plates may be varied. For example, the plates at the top of the cylindrical vessel may be close together and the plates at the bottom of the vessel may be further apart. Such spacing of the plates may manipulate the velocity of the process fluid, thereby positively affecting heat transfer.

The process fluid may not immediately cool to a solid-forming or liquid-forming temperature as soon as it enters the cylindrical vessel. Consequently, it is anticipated that solids formation will not be consistent throughout the vessel. It is possible that very few solids will form or accumulate where the process fluid enters the vessel, but that more solids will form or accumulate further along the path of the process fluid within the vessel. Aspects of the disclosure include varying the geometry (i.e., size, shape, and angular position) of the notches within each plate to match variation of solid formation and/or accumulation throughout the cylindrical vessel. This is done to maximize heat transfer area and minimize plate area sacrificed for solid throughput. Similarly, the spacing of the plates (as discussed above) may be designed to reflect the amount of solids expected to form in between and need to be moved in between each pair of adjacent plates.

Figure 4:
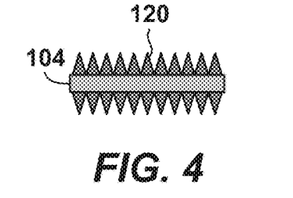
FIG. 4 is a side elevational view of an internally cooled plate according to another aspect of the disclosure.
Figure 5:
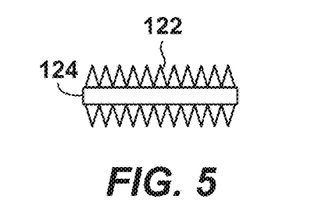
FIG. 5 is a side elevational view of a scraper usable with the internally cooled plate of FIG. 4.
Figure 6:
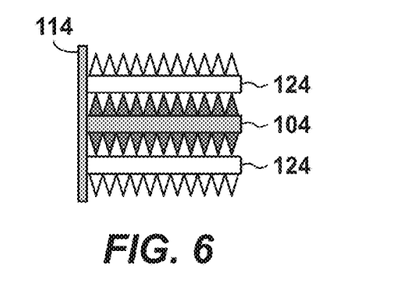
FIG. 6 is a side elevational view of a multi-plate scraped heat exchanger using the aspects shown in FIGS. 4-5.

The plates 104 have been shown generally in FIGS. 1-3 as having smooth outer surfaces. However, it is possible to modify the top and/or bottom outer surfaces of some or all of the plates 104 to include surface features thereof. Such surface features (e.g., thermal fins) will increase the surface area of the outer surface of the plates and thereby increase the transfer of heat between the process fluid and the plates. Conductive heat transfer to gases tends to be less effective than liquids and hence means to increase contact surface area can be particularly valuable. However, providing surface features while also allowing surface scraping requires a novel approach. In an aspect, as shown in FIGS. 4-6, the surface features comprise concentric fins 120. The plates 104 may be manufactured to permit cooling fluid to pass through the fins, or alternatively the cooling fluid circulates only through the plates, relying on the heat transfer properties of the fins to conduct the cooling energy of the cooling fluid to the process fluid. The geometries (e.g., spacing, thickness, and height) of the concentric fins may vary to optimize fabrication, material utilization, heat transfer effectiveness, and/or solid removal effectiveness. The concentric fins 120 may be formed such that all fins on a plate are the same distance from their respective adjacent fins. However, if a different heat transfer strategy is desired, such as cooling the process fluid more at a greater distance from the center of the plate, the fins may be spaced closer together at the outer radius of the plate. Other variations of fin concentration should be evident to one of ordinary skill. To ensure removal of solids between the concentric fins 120, the scraper 122 attached to the rotating arm 124 is modified to have a complementary shape with respect to its respective concentric fins. Furthermore, in some embodiments the surface of the plates 104 and/or the concentric fins 120 may be modified with application of icephobic or anti-icing coatings or treatment. This approach facilitates removal of solids formed on the surfaces and may also improve scraper equipment life and reduce power requirements of the scraper motor.

Figure 7:
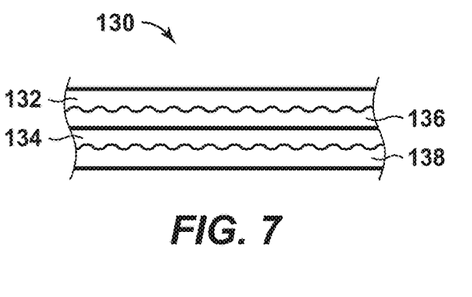
FIG. 7 is a side elevational view of an internally cooled plate according to another aspect of the disclosure.
Figure 8:
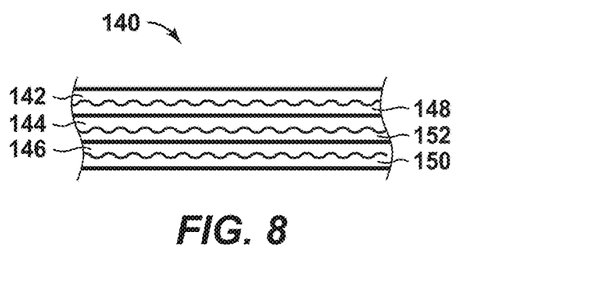
FIG. 8 is a side elevational view of an internally cooled plate according to another aspect of the disclosure.
Figure 9:
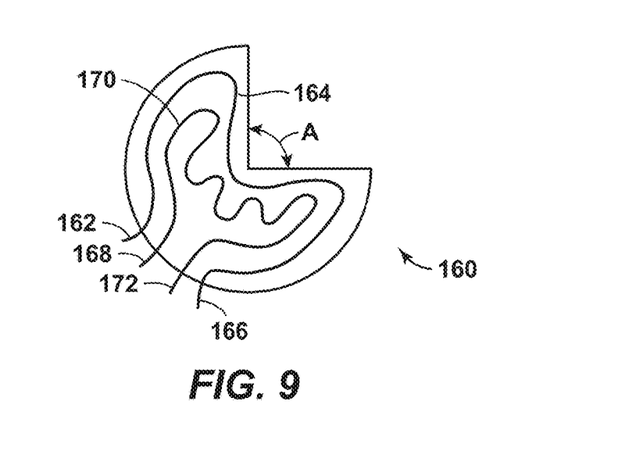
FIG. 9 is a top plan view of an internally cooled plate according to another aspect of the disclosure.
Figure 10:
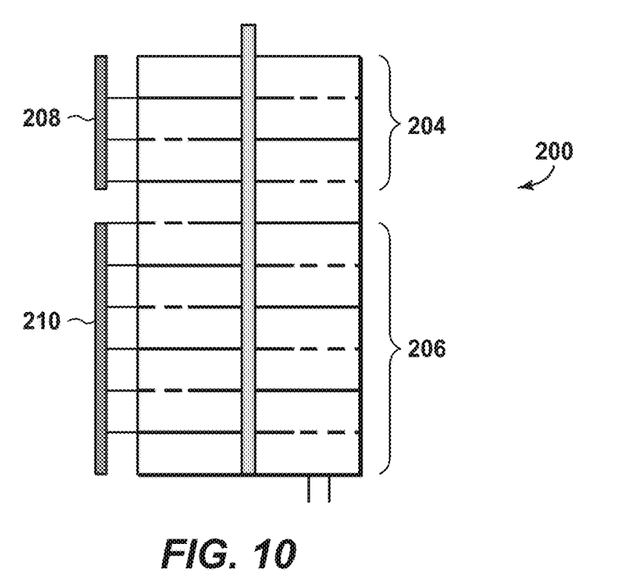
FIG. 10 is a side elevational view of a multi-plate scraped heat exchanger according to aspects of the disclosure.

To optimize the cooling capacity of the disclosed heat exchanger, two or more different cooling fluids may be used therein. As used herein, "different" refers to the composition of the cooling fluids and/or the inlet temperature of the cooling fluids. FIG. 7 is a detail view of an internally cooled plate 130 according to another aspect of the disclosure. Plate 130 includes multiple segregated layers, which are represented in FIG. 7 as first and second segregated layers 132, 134. The first and second segregated layers are configured to permit separate flow of two different cooling fluids 136, 138 therein. FIG. 8 shows another aspect of the disclosure in which an internally cooled plate 140 has first, second, and third segregated layers 142, 144, 146. First and second cooling fluids 148, 150 are flowed through the outer segregated layers, which in FIG. 8 are first and third segregated layers 142, 146. A third cooling fluid 152 may be flowed through the inner segregated layer 144. FIG. 9 schematically depicts another aspect of the disclosure in which, instead of employing multiple layers in an internally cooled plate, multiple segregated passages in an internally cooled plate 160 may be used. A first cooling fluid may be flowed through a first inlet 162, a first passage 164, and a first outlet 166. A second cooling fluid may be flowed through a second inlet 168, a second passage 170, and a second outlet 172. The first and second passages 164, 170 may be configured to cool different portions of the plate 160 or may be configured to cool generally the same parts of the plate and readily interchange thermal energy. FIG. 10 depicts a heat exchanger 200 according to another aspect of the disclosure in which two or more different and progressively colder cooling fluids may be sent to different zones 204, 206 in a stack of internally cooled plates. Each zone may include a set of one or more sequentially or consecutively arranged plates. Separate manifolds 208, 210 may provide different cooling fluids to the respective zones 204, 206. Cooling the process fluid in this fashion enables the process fluid to be cooled by different cooling fluids based on its lateral position in the cylindrical vessel. This may be particularly beneficial when a large degree of cooling is desired of the process fluid. For example, an initial cooling (i.e., as the fluid flows over the plates nearest the inlet) may be optimized with one type of refrigerant and the subsequent deep cooling (i.e., as the fluid flows over the plates nearest the outlet) may be optimized with another type of refrigerant (e.g., one having a lower boiling point than the initial refrigerant).

Disclosed aspects employing different cooling fluids may require separate refrigeration circuits in which the different cooling fluids are cooled and/or reconditioned before being re-used in the heat exchanger. On the other hand, if the different cooling fluids have the same composition, a single refrigeration circuit may be employed that includes additional processes to further cool a portion of a common cooling fluid, to thereby generate first and second cooling fluids having different temperatures. Taking the aspects shown in FIG. 9 as an example, the first cooling fluid exiting the first outlet 166 may be cooled and/or reconditioned in a first refrigeration circuit (not shown) before being re-circulated to the first inlet 162. The second cooling fluid exiting the second outlet 172 may be cooled and/or reconditioned in a second refrigeration circuit (not shown) before being re-circulated to the second inlet 168. However, if the first and second cooling fluids have the same composition, the first and second cooling fluids may be cooled and/or reconditioned in a single refrigeration circuit (not shown), with the second cooling fluid being subjected to additional processes to ensure it has a different temperature at the second inlet 168 than the temperature of the first cooling fluid at the first inlet 162.

The heat exchanger shown in FIG. 1 includes a cooling fluid supplied to the plates using a manifold 110. The manifold is depicted as simultaneously supplying the cooling fluid to all of the plates, but this may not necessarily be the best strategy for optimal heat transfer in some instances. According to another aspect of the disclosure, the cooling fluid may be supplied sequentially to the plates. In other words, the cooling fluid may be supplied to an inlet in the lowest plate in the cylindrical vessel. Cooling fluid exiting the lowest plate is directed to the second-lowest plate, and then to the third-lowest plate, and so forth. Process fluid may enter the top of the cylindrical vessel and exit the bottom thereof, thereby flowing counter-current to the direction of flow of the cooling fluid. Alternatively, the process fluid may enter the bottom of the cylindrical vessel and exit the top thereof, thereby flowing co-current to the direction of flow of the cooling fluid.

Figure 11:
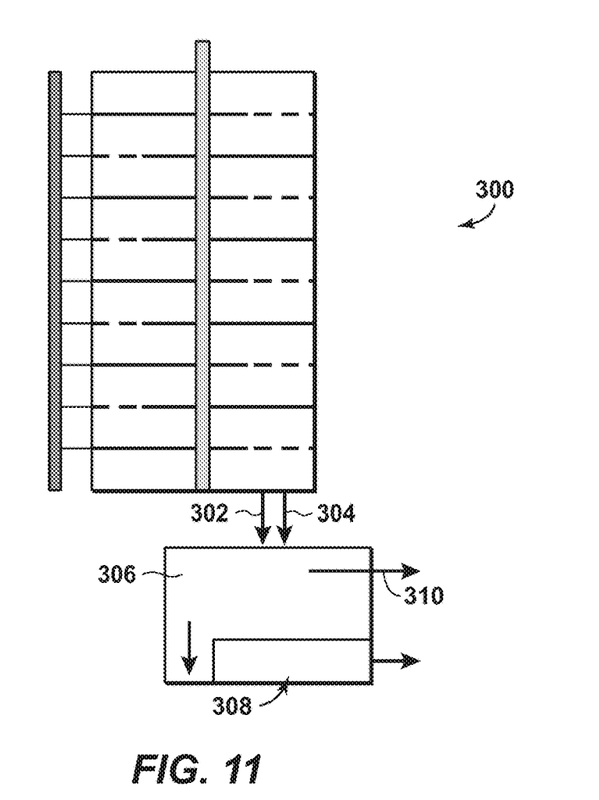
FIG. 11 is a side elevational view of a multi-plate scraped heat exchanger according to aspects of the disclosure.

FIG. 11 depicts another aspect of the disclosure in which disposal of solids formed therein is addressed. Solids 302 and cooled process fluid 304 exit heat exchanger 300 and are sent to a separation vessel 306. The separation vessel may be a collection bin or the like. The solids 302 fall to the bottom of the separation vessel and are removed therefrom using an auger 308. The auger is configured to transport the solids out of the system while minimizing or preventing the process fluid from exiting with the solids. In some embodiments, this may be accomplished by configuring the auger to compress the solids, which will be a collection of particles, as they are being transported out of the separation vessel. This may be accomplished via known ways such as by having the pitch of auger blades tighten along its axis and/or have the auger fit into a tapered housing. The compressed solids will have low permeability to gas and hence will prevent the cooled process fluid from exiting the separation vessel via the auger. Rotation of the auger 308 removes compressed solids from the separation vessel 306 for further processing as previously described. The cooled process fluid 304 exits the separation vessel 306 through an opening 310 for further processing, which in a liquefaction process may include further chilling as previously described.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used to produce hydrocarbons in a feed stream extracted from, for example, a subsurface region. Hydrocarbon extraction may be conducted to remove the feed stream from for example, the subsurface region, which may be accomplished by drilling a well using oil well drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described are considered to be within the scope of the disclosure.

The articles "the", "a" and "an" are not necessarily limited to mean only one, but rather are inclusive and open ended so as to include, optionally, multiple such elements.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A scraped heat exchanger apparatus for cooling a gaseous process fluid which can freeze-out solids, the apparatus comprising:
    a vessel;
    a plurality of internally cooled plates disposed parallel to each other within the vessel, wherein a spacing between adjacent ones of the plurality of internally cooled plates is varied within the vessel;
    a rotating shaft disposed at a central axis of the vessel;
    a rotating scraper arm, connected to the rotating shaft, and disposed to move between adjacent ones of the plurality of internally cooled plates, wherein the rotating scraper arm includes a scraper positioned to scrape solids from an outer surface of said adjacent ones of the plurality of internally cooled plates;
    a cooling fluid configured to flow through an interior of each of the plurality of internally cooled plates and cool a gaseous process fluid flowing between adjacent ones of the plurality of internally cooled plates; and
    an opening in each of one or more of the plurality of internally cooled plates, each opening configured to permit the gaseous process fluid and solids removed from the gaseous process fluid and scraped by the rotating scraper arm to pass through the one or more of the plurality of internally cooled plates.

2. The apparatus of claim 1, wherein the plurality of internally cooled plates are disposed in a vertical orientation.

3. The apparatus of claim 1, wherein the plurality of internally cooled plates are disposed in a horizontal orientation such that said plates comprise a vertical stack, and wherein the scraped solids fall through the opening in the one or more of the plurality of internally cooled plates.

4. The apparatus of claim 1, wherein the opening in each of the one or more of the plurality of internally cooled plates comprises a notch extending outwardly from the central axis.

5. The apparatus of claim 4, wherein each of the one or more of the plurality of internally cooled plates are arranged in a consecutive sequence, and wherein the notches in adjacent ones of the consecutively sequenced plates are angularly offset from one another, to thereby provide a tortuous path for the gaseous process fluid to flow through the vessel while being cooled by the plates.

6. The apparatus of claim 1, wherein each of the plurality of internally cooled plates are sealed to an inner wall of the vessel to eliminate bypass of the process fluid around the plates.

7. The apparatus of claim 1, further comprising a surface feature on an outer surface of one of the plurality of internally cooled plates, wherein the scraper is shaped to rotate past the surface feature.

8. The apparatus of claim 7, wherein the surface feature comprises a set of concentric circular-path fins, the concentric circular-path fins being centered on the central axis, wherein a shape of the scraper is configured to remove solids from in between adjacent fins in the set of concentric circular-path fins, and wherein the circular-path fins are configured to increase heat transfer between the cooling fluid and gaseous process fluid.

9. The apparatus of claim 1, wherein the apparatus is configured to supply the cooling fluid sequentially to the plurality of internally cooled plates.

10. The apparatus of claim 1, wherein the apparatus is configured to supply the cooling fluid sequentially to the plurality of internally cooled plates in a direction that is counter-current to a direction of flow of the gaseous process fluid.

11. The apparatus of claim 1, wherein the cooling fluid is a first cooling fluid, and wherein at least one of the plurality of internally cooled plates includes first and second segregated layers therein, the first segregated layer configured to permit the first cooling fluid to flow through an interior thereof, and the second segregated layer configured to permit a second cooling fluid to flow through an interior thereof;
    wherein the first cooling fluid is different in composition and/or temperature from the second cooling fluid.

12. The apparatus of claim 11, wherein each of the first and second cooling fluids have a composition comprising primarily ethane, primarily propane, primarily methane, or primarily nitrogen.

13. The apparatus of claim 1, wherein the cooling fluid is a first cooling fluid, and wherein at least one of the plurality of internally cooled plates includes first and second segregated passages therein, the first passage configured to permit the first cooling fluid to flow through an interior thereof, and the second passage configured to permit a second cooling fluid to flow through an interior thereof;
wherein the first cooling fluid is different in composition and/or temperature from the second cooling fluid, and
wherein the first and second passages are within a single layer of each of the internally cooled plates.

14. The apparatus of claim 1, wherein the cooling fluid is a first cooling fluid, wherein the plurality of internally cooled plates are divided into first and second sets, each of the first and second sets comprising one or more consecutively or sequentially arranged internally cooled plates; and
wherein the first cooling fluid is configured to flow through interiors of internally cooled plates in the first set and a second cooling fluid is configured to flow through interiors of internally cooled plates in the second set.

15. The apparatus of claim 14, wherein the first cooling fluid enters the first set at a temperature higher than a temperature at which the second cooling fluid enters the second set.

16. The apparatus of claim 1, further comprising:
a separator configured to receive the gaseous process fluid and the solids from the vessel after being cooled in the vessel, the separator configured to separate the solids from the gaseous process fluid, the separator having an opening through which the process gas exits therefrom; and
an auger having a first end located in a bottom portion of the separator, the auger configured to transport the solids from the separator such that the gaseous process fluid is prevented from exiting the separator through the auger.

17. A scraped heat exchanger apparatus for cooling a gaseous process fluid which can freeze-out solids, the apparatus comprising:
a vessel;
a plurality of internally cooled plates disposed parallel to each other within the vessel;
a rotating shaft disposed at a central axis of the vessel;
a rotating scraper arm, connected to the rotating shaft, and disposed to move between adjacent ones of the plurality of internally cooled plates, wherein the rotating scraper arm includes a scraper positioned to scrape solids from an outer surface of said adjacent ones of the plurality of internally cooled plates;
a cooling fluid configured to flow through an interior of each of the plurality of internally cooled plates and cool a gaseous process fluid flowing between adjacent ones of the plurality of internally cooled plates; and
an opening in each of one or more of the plurality of internally cooled plates, each opening configured to permit the gaseous process fluid and solids removed from the gaseous process fluid and scraped by the rotating scraper arm to pass through the one or more of the plurality of internally cooled plates,
wherein the opening in each of the one or more of the plurality of internally cooled plates comprises a notch extending outwardly from the central axis, and
wherein at least one of a notch size, a notch shape, or a position of the notch is varied from plate to plate within the vessel to match a variation in an amount of solids generated from plate to plate.

18. The apparatus of claim 17, wherein a spacing between adjacent ones of the plurality of internally cooled plates is varied within the vessel.

19. The apparatus of claim 17, further comprising:
a separator configured to receive the gaseous process fluid and the solids from the vessel after being cooled in the vessel, the separator configured to separate the solids from the gaseous process fluid, the separator having an opening through which the process gas exits therefrom; and
an auger having a first end located in a bottom portion of the separator, the auger configured to transport the solids from the separator such that the gaseous process fluid is prevented from exiting the separator through the auger.

20. A scraped heat exchanger apparatus for cooling a gaseous process fluid which can freeze-out solids, the apparatus comprising:
a vessel;
a plurality of internally cooled plates disposed parallel to each other within the vessel;
a rotating shaft disposed at a central axis of the vessel;
a rotating scraper arm, connected to the rotating shaft, and disposed to move between adjacent ones of the plurality of internally cooled plates, wherein the rotating scraper arm includes a scraper positioned to scrape solids from an outer surface of said adjacent ones of the plurality of internally cooled plates;
a cooling fluid configured to flow through an interior of each of the plurality of internally cooled plates and cool a gaseous process fluid flowing between adjacent ones of the plurality of internally cooled plates;
an opening in each of one or more of the plurality of internally cooled plates, each opening configured to permit the gaseous process fluid and solids removed from the gaseous process fluid and scraped by the rotating scraper arm to pass through the one or more of the plurality of internally cooled plates;
a separator configured to receive the gaseous process fluid and the solids from the vessel after being cooled in the vessel, the separator configured to separate the solids from the gaseous process fluid, the separator having an opening through which the process gas exits therefrom; and
an auger having a first end located in a bottom portion of the separator, the auger configured to transport the solids from the separator such that the gaseous process fluid is prevented from exiting the separator through the auger.

* * * * *